United States Patent Office 3,062,737
Patented Nov. 6, 1962

3,062,737
DEHYDRATION PROCESS
Julian L. Azorlosa and Anthony J. Martinelli, Easton, Pa., assignors to General Aniline & Film Corporation, New York, N.Y., a corporation of Delaware
Filed Dec. 28, 1959, Ser. No. 862,175
12 Claims. (Cl. 210—22)

This invention relates to a new and useful dehydration process, and particularly to methods for dehydrating materials employing the dialysis technique.

The technique for removal of water and other liquids from a mass of material by a dialysis process is old and well known. Specifically, the technique involves the employment of a semipermeable membrane which permits the passage of water or the other liquid to be removed through the membrane and thereby dehydrates the original mass. It is of course preferable and often necessary that the membrane employed permit only the passage of the fluid desired to be removed from the mass and obstruct the passage of other materials from the mass or from the dialysis medium which is employed on the other side of the membrane. Numerous materials have been suggested for use as dialysis membranes. Among these mention may be made of animal parchment, gelatin films, supported or unsupported, cellophane sheeting and the like. The membrane to be operable must be one which is wetted and permeated by the fluid to be passed. In the process of the present invention involving a technique of dehydration, the fluid to be passed is water and the membrane, therefore, should be one which is wet by water and is permeable to this compound.

In order for dialysis to proceed through a semipermeable membrane, there must be present on one side thereof, of course, the material to be dehydrated and on the other side of the membrane one must employ a composition into which the water is directed or attracted through the membrane. As mentioned above, it is often desirable, and in the case of foods and pharmaceutics, usually most necessary, that there be no flow of material through the membrane in a direction opposite to the flow of water therethrough. It has now been discovered that an outstanding dialysis composition, that is, one which is employed to remove water from the water-containing mass, is one which contains a water soluble polymeric material in aqueous solution and preferably in a rather concentrated aqueous solution.

It is therefore an object of the present invention to provide new and useful processes for the removal of water from masses containing water.

It is still another object of this invention to provide new and useful processes for the dehydration of aqueous compositions.

It is still another object of the present invention to provide new and useful processes for the removal of water from aqueous compositions, and in particular water containing food and pharmaceutical compositions.

It is still a further object of the present invention to provide new and useful processes for dehydrating aqueous masses employing a dialysis technique.

It is a still further object of the present invention to provide new and useful processes to effect dialysis of water containing compositions using water soluble polymeric compositions as the dialysis media.

It is still a further object of the present invention to provide new and useful processes whereby water is removed from aqueous compositions through a suitable semipermeable membrane.

It is still further object of the present invention to provide new and useful processes whereby water is removed from aqueous compositions through a suitable semipermeable membrane, employing water soluble polymers in solution as the dialysis media.

Other objects will appear hereinafter as the description proceeds.

While numerous materials have been suggested as dialysis media, and in the instance of the removal of water from an aqueous mass, such materials as ethyl glycol have been employed, none of the heretofore used substances have been deemed acceptable due to the fact that either contamination of the material to be dehydrated occurred, or the rate of dehydration was too slow. Furthermore, in many instances where the rate was satisfactory, the maximum amount of water which could be removed was relatively small in comparison to the total amount of water present in the mass to be dehydrated. Thus, for example, in the case of water containing foodstuffs such as fruit juices and the like, the water constitutes the major content of the composition, and processes heretofore employed could not efficiently remove the major amount thereof to effect concentration of the food product. It has now been discovered that by the employment of water soluble polymers in concentrated aqueous solutions, rapid and efficient water removal may be effected by dialysis without the danger of contaminating the product to be dehydrated. In order to obtain a rapid rate of dialysis concentrated solutions of the water soluble polymers must be employed since such solutions are soon diluted to a point where no further water will pass through the selected membrane from the product to be dehydrated. In the processes of the instant invention, solutions containing at least about 25% water soluble polymer should be employed. It has further been found that to prevent any contamination of the product undergoing dialysis, the molecular weight of the polymer should be at least about 1000, and preferably greater than about 1500. The contemplated polymers include homopolymers, as well as copolymers, terpolymers and interpolymers. The preferred polymers are those obtained by the polymerization of ethylene oxide whereby polyethylene glycols are obtained. Reaction products of active hydrogen compounds with ethylene oxide to yield polyethenoxy compounds of the required molecular weight are also deemed within the ambit of the contemplated ethylene oxide polymers. Such condensation products may be derived from alcohols, phenols, amines, amides, substituted amides, sulfonamides, substituted sulfonamides, acids, and the like, reacted with at least about 20 to 25 moles of ethylene oxide whereby the molecular weight of the resulting product is greater than about 1000.

The polyethylenic glycols which are herein preferred may be represented by the following formula:

$$(C_2H_4O)_n(OH)_2$$

wherein $n$ is an integer of at least about 25 to yield a total molecular weight of at least about 1000.

The ethylene oxide condensation products with the active hydrogen containing compounds mentioned above may be represented by the following formulas:

I. With alcohols $(R(OH)_m)$

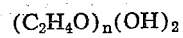

wherein $n$ = number of moles of added ethylene oxide and $m$ = number of hydroxyls, i.e., 1, 2 or more.

II. With phenols—same as with alcohols.

III. With amides $(R(CONHR_1)_m)$

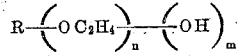

$m$ = 1, 2 or more
$R_1$ = hydrogen, alkyl or aryl with $m$ = 1;

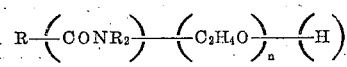

wherein $n$ = number of moles of ethylene oxide added and $$R_2 = R_1 \text{ or } \text{\textendash}(C_2H_4O)_pH$$

wherein $p$ = moles of ethylene oxide added above "$n$" moles.

IV. With amines ($R\text{---}NHR_1$) where $R_1 = H$ or alkyl or aryl

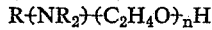

wherein $n$ = number of moles of ethylene oxide added and $$R_2 = R_1 \text{ or } \text{\textendash}(C_2H_4O)_pH$$

wherein $p$ = moles of ethylene oxide added above "$n$" moles.

V. With sulfonamides—same as with amides.
VI. With acids—$R\text{\textendash}(COOH)_m$ $m = 1, 2$ or more

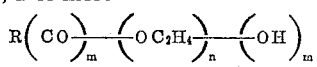

$n$ = number of moles of ethylene oxide added

In addition to the polyethylene glycols and the ethylene oxide condensates mentioned above, other suitable water soluble polymers include polyvinyl pyrrolidone (K values of from about 15 to 120), polyvinyl morpholone, polyvinyl oxazolidone, polyvinyl alcohol, polyvinyl methyl ether, interpolymers of vinyl pyrrolidone, vinyl morpholone, vinyl oxazolidone and vinyl methyl ether, which yield water soluble products with other copolymerizable ethylenically unsaturated compounds such as maleic anhydride, ethylene vinyl acetate, arcylic acid, acrylamide, methacrylamide and the like, polyacrylic acid, polyacrylamide, the half amides of the aforementioned maleic anhydride copolymers and the like.

The temperature for carrying out the processes of the instant invention may be varied from about room temperature or even below to elevated temperatures below the degradation temperature of the products to be treated. In general, since the process is most advantageous in the dehydration of food products, it is desirable to carry out the process at temperatures around room temperature since even slight elevations of temperature with most of these products seriously affect the palatability thereof. Since the rate of dialysis increases with increasing temperature, temperatures below room temperature are normally not desirable. However, with certain products this may be necessary, and the process is equally applicable at such low temperatures, down to just above the freezing point of the composition. It has been found that concentrations of the instant polymers from about 25% by weight based on the total weight of dialysis solution up to about 50% by weight is the preferred range since most of the polymeric materials present in concentrations above this amount a viscosity problem which makes the operation of the dialysis technique difficult to carry out.

In general, the process of the instant invention is carried out either in a batch process or in a continuous manner by passing the liquid to be concentrated or dehydrated, in the case of a continuous method, through or on either side of a suitable, and preferably a cellophane membrane. On the other side of the membrane the polymer solution is run either concurrently or countercurrently, and in short order the aqueous mass is soon dehydrated to a substantial degree. Agitation is found to be desirable since it increases the rate of dehydration, and in a continuous dehydration process as described above, agitation is usually suitably arrived at by the flow of liquids on either side of the membrane. In a batch process where the material to be dehydrated is merely contained within a cellophane bag or the like, agitation of the surrounding polymer solution by any suitable means yields increased dehydration rates.

The invention is illustrated, by way of example, in the accompanying drawings, in which.

The following examples will serve to illustrate the present invention without being deemed limitative thereof.

*Example 1*

A sample of tomato juice is placed in a cellophane tube 1 inch in diameter and 6 inches long having walls 1 mil in thickness. Both ends of the casing are sealed and the "sausage" is placed in a large volume (2000 ml.) 45% solution of polyethylene glycol (molecular weight, 4000). The entire assembly is then shaken mechanically and it is found that after ½ hour about 60% of the water has been removed from the tomato juice, and after 1 hour more than 85% of the total water content of the tomato juice has been removed.

*Example 2*

Figure 1:
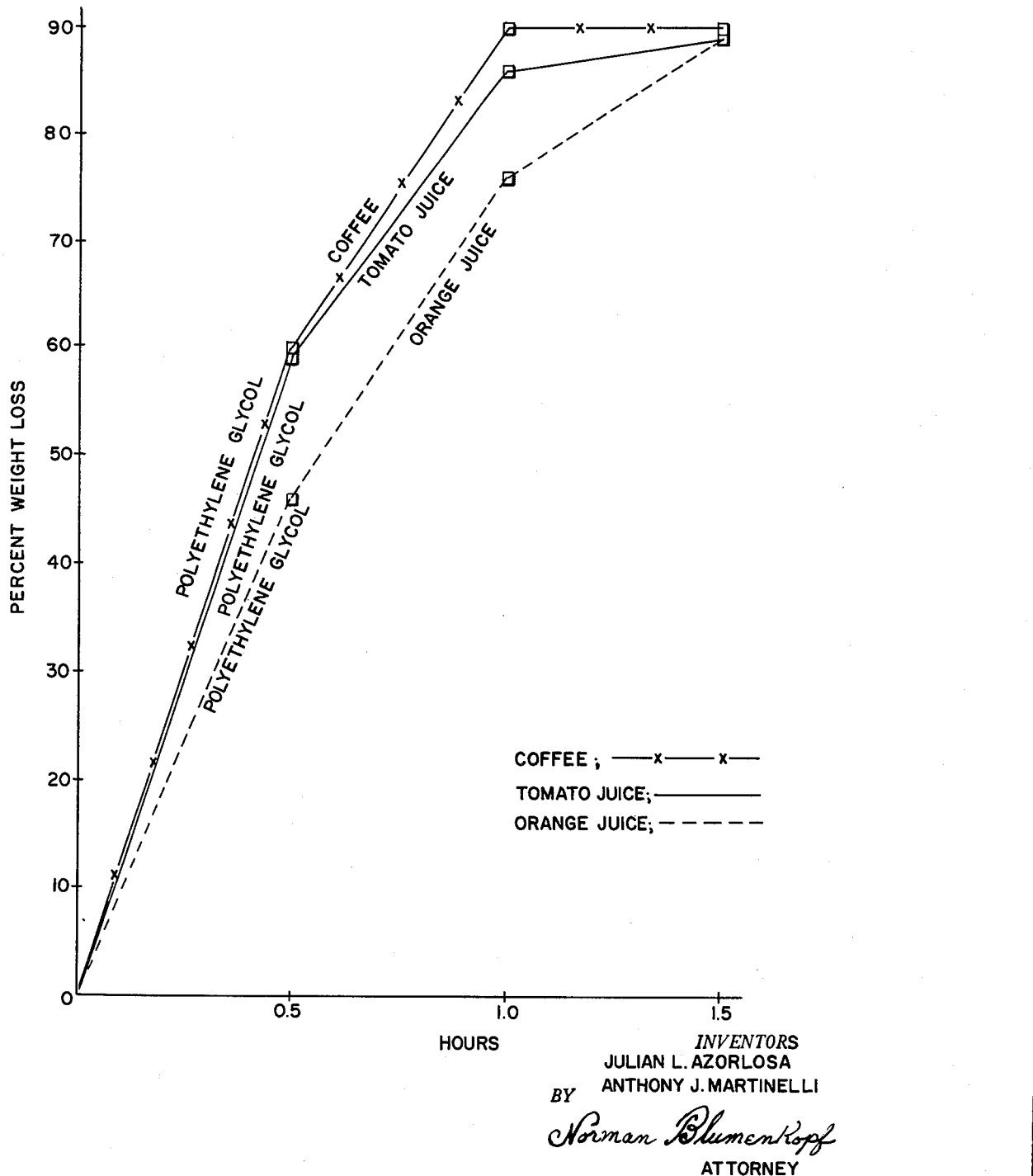
FIGURE 1 is a plot of percent water loss from coffee, tomato juice and orange juice against time employing a 45% solution of polyethylene glycol (molecular weight, 4000).

Example 1 is repeated employing 15 ml. of tomato juice in a 5 inch length of cellophane tubing between the knotted ends. The sausage is shaken mechanically in 350 mls. of 45% aqueous solution of polyethylene glycol (molecular weight, 4000). In FIG. 1 there appears a plot of the per cent water loss from the tomato juice against time, and it will be seen that about 86% of the water is removed in about 1 hour.

*Example 3*

Example 2 is repeated employing a 25% solution of polyethylene glycol (molecular weight, 4000). As will be seen in FIG. 2, about 80% of the water is removed in 1 hour, and about 90% in 1½ hours.

The processes of Examples 1, 2 and 3 as described above are carried out at room temperature.

*Example 4*

Figure 2:
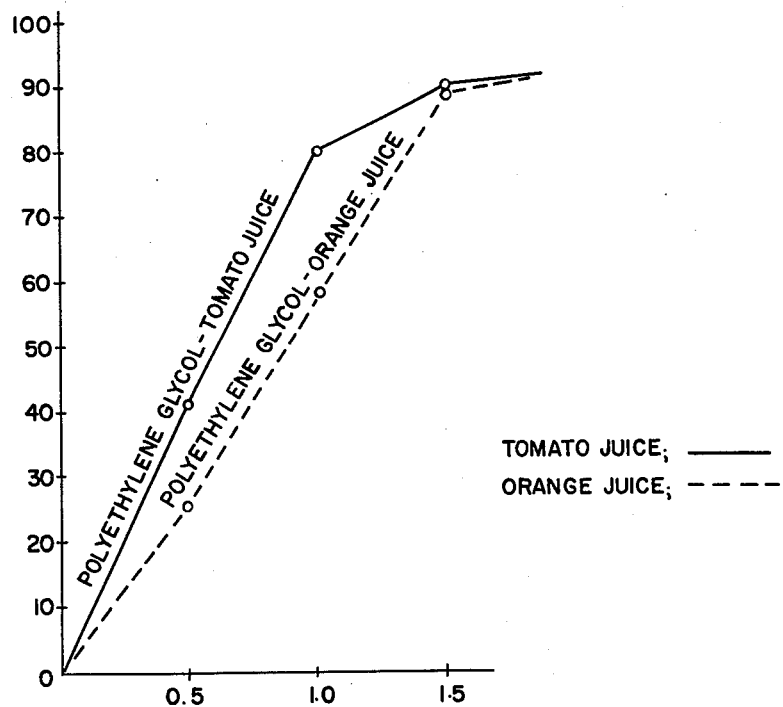
FIGURE 2 is a plot of percent water loss from tomato juice and orange juice against time employing a 25% solution of polyethylene glycol (molecular weight, 4000).

Examples 1, 2 and 3 are repeated employing orange juice prepared from a frozen concentrate diluted, 1 part frozen juice to 3 parts distilled water. The results are shown in FIGS. 1 and 2, and it will be observed that in the case of a 45% polymer solution, more than 75% of the water is removed in about 1 hour, and with a 25% polymer solution, almost 90% is removed in about 1½ hours.

*Example 5*

Examples 1 and 2 are again repeated employing a solution of 2.5 g. of instant coffee in 90 mls. of water. The rates of dehydration are similarly plotted in FIG. 1, and it will be seen that about 60% of the water is removed in a half hour, and 90% in an hour.

The temperature of operations of Examples 4 and 5 is also room temperature, 70° F.

*Example 6*

Examples 1 through 5 are repeated employing polyethylene glycols having molecular weights of 1500, 3000, and 7500. Excellent rates of dehydration are achieved.

*Example 7*

Example 3 is repeated employing 25% solutions of the following polymeric substances:

(1) Vinyl methyl ether maleic anhydride copolymer, specific viscosity, 0.1;
(2) Vinyl methyl ether maleic anhydride copolymer, specific viscosity, 0.5;
(3) Nonyl phenoxy polyoxy ethylene ethanol containing 30 moles of ethylene oxide per mole of nonyl phenol;
(4) Polyvinyl pyrrolidone (K=30).

These polymers are found to be effective to remove from about 30 to about 50% of the water of the tomato juice in about 1 hour. At the end of 2 hours, the polyvinyl pyrrolidione and the vinyl methyl ether maleic anhydride cololymers have removed more than 80% of the water and the nonyl phenol ethylene oxide condensate has removed about 65% of the water present in the tomato juice.

*Example 8*

Sausages as described in Examples 2 and 4 are prepared containing tomato juice and orange juice and dialyzed in 30% solutions of polyvinyl pyrrolidone of K equals 15 and K equals 30. With tomato juice, it is found that both molecular weight grades of polyvinyl pyrrolidone have removed between 65% and 70% of the water after 1½ hours, and in the case of orange juice, between 50% and 60% of the water has been removed in the same length of time. After about 3 hours at this concentration, both the tomato juice and the orange juice with either molecular weight grade of polymer have been found to have lost between 85% 90% of the water content.

*Example 9*

A continuous dialysis apparatus is employed wherein the product to be dehydrated is run through a continuous length of cellophane tubing immersed in an agitated bath of polymer solution. The length of cellophane tubing and rates of flow are adjusted to give a residence time within the dialysis apparatus of 1 hour. Employing a 25% solution of polyethylene glycol (molecular weight, 4000), it is found that more than 80% of the water of the tomato juice is removed therefrom after passage through the equipment. The process is carried out at room temperature. The ability of such a process to effect such a substantial water removal at room temperatures is a tremendous advance in the art of food dehydration since there is no danger of affecting the quality or taste of the resulting dehydrated product.

*Example 10*

Examples 1 and 5 are repeated employing, however, temperatures of solutions of 100° F. The rates of dehydration are somewhat increased.

*Example 11*

Example 1 is repeated employing temperatures of solution of 120° F. The rates of water removal from the aqueous masses are somewhat greater than when the process is carried out at room temperature.

*Example 12*

Example 3 is once again repeated employing a 50% solution of the polyethylene glycol. A somewhat increased rate of dehydration results.

*Example 13*

Example 1 is once again repeated employing in lieu of a regenerated cellulose membrane (that is, cellophane), a gelatin membrane prepared by dipping a finely woven cotton cloth into a hot concentrated solution of gelatin and water and permitting the impregnated cloth to cool before forming into a suitable casing.

*Example 14*

The procedure of Example 8 is repeated employing 25% and 40% solutions of polyvinyl morpholone, polyvinyl caprolactam, and polyvinyl oxazolidone. Comparable results are obtained.

*Example 15*

Examples 2, 4, and 5 are repeated employing 30% aqueous solutions of an ethylene-maleic anhydride copolymer having a molecular weight in excess of about 1500. Good rates of dehydration are obtained.

*Example 16*

Example 2 is once again repeated employing a condensate of polypropylene oxide and ethylene oxide, the polypropylene oxide group having a molecular weight within the range of 1501 to 1800 and the condensate containing about 40% by weight of ethylene oxide. Such a polymer is commercially available under the name "Pluronic L–64." Excellent rates of water removal are obtained.

*Example 17*

Examples 3 and 5 are repeated using a polymer similar to that of Example 16 except that the molecular weight of the polypropylene oxide moiety is 2000 and 30 moles of ethylene oxide have been condensed therewith.

*Example 18*

The procedure of Example 15 is again repeated employing the same copolymer except that it has been subjected to hydrolysis to yield free carboxyl groups.

*Example 19*

Example 15 is once again repeated employing the same copolymer except that it has been converted to the half amide.

Other variations in and modifications of the described processes which will be obvious to those skilled in the art can be made in this invention without departing from the scope or spirit thereof.

We claim:

1. A process for dehydrating an aqueous mass which comprises permitting the water contained in said mass to pass therefrom through a semipermeable membrane into an aqueous solution containing at least about 25% by weight based on the weight of the solution of a water soluble polymer.

2. A process for dehydrating an aqueous mass which comprises permitting the water contained in said mass to pass therefrom through a semipermeable membrane into an aqueous solution containing at least about 25% by weight of a water soluble polymer of ethylene oxide having a molecular weight of at least about 1000.

3. A process for dehydrating an aqueous mass which comprises permitting the water contained in said mass to pass therefrom through a semipermeable membrane into an aqueous solution containing at least about 25% by weight based on the weight of the solution of a polyethylene glycol having a molecular weight of about 4000.

4. A process for dehydrating an aqueous mass which comprises permitting the water contained in said mass to pass therefrom through a semipermeable membrane into an aqueous solution containing at least about 25% by weight based on the weight of the solution of a water soluble polymer of vinyl pyrrolidone.

5. A process as defined in claim 4 wherein the vinyl pyrrolidone has a K value of about 30.

6. A process for dehydrating an aqueous mass which comprises permitting the water contained in said mass to pass threfrom through a semipermeable membrane into an aqueous solution containing at least about 25% by weight based on the weight of the solution of a water soluble copolymer of a vinyl alkyl ether with maleic anhydride.

7. A process as defined in claim 6 wherein the copolymer is characterized by a specific viscosity of from about 0.1 to 0.5.

8. A process as defined in claim 1 wherein the temperature for carrying out the process is about room temperature.

9. In a process for removing water from an aqueous mass wherein said aqueous mass is brought into contact with a semipermeable membrane on one side thereof, the improvement which comprises contacting the other side of said membrane with an aqueous solution containing at least about 25% by weight of a water soluble polymer having a molecular weight of at least about 1000.

10. A process as defined in claim 9 werein the polymer is a polyethylene glycol having a molecular weight above about 1000.

11. A process as defined in claim 9 wherein the polymer is polyvinyl pyrrolidone.

12. A process as defined in claim 9 wherein the polymer is a copolymer of a vinyl alkyl ether and maleic anhydride.

References Cited in the file of this patent

UNITED STATES PATENTS 1,885,393     Van Schaask _____ Nov. 1, 1932